(12) United States Patent
Van Rensburg

(10) Patent No.: US 8,364,550 B2
(45) Date of Patent: Jan. 29, 2013

(54) PAYMENT SYSTEM FOR ELECTRONIC DATA

(75) Inventor: Johannes Janse Van Rensburg, Stellenbosch (ZA)

(73) Assignee: Fundamo (Proprietary) Limited (ZA)

( * ) Notice: Subject to any disclaimer, the term of this patent is extended or adjusted under 35 U.S.C. 154(b) by 70 days.

(21) Appl. No.: 12/448,455

(22) PCT Filed: Dec. 10, 2007

(86) PCT No.: PCT/IB2007/003847
§ 371 (c)(1),
(2), (4) Date: Nov. 16, 2009

(87) PCT Pub. No.: WO2008/075154
PCT Pub. Date: Jun. 26, 2008

(65) Prior Publication Data
US 2010/0100453 A1    Apr. 22, 2010

(30) Foreign Application Priority Data
Dec. 18, 2006 (ZA) .................................. 2006/10620

(51) Int. Cl.
*G06Q 30/00* (2012.01)
*G06Q 20/00* (2012.01)

(52) U.S. Cl. ........ 705/26.1; 705/17; 705/26.82; 705/40; 235/375

(58) Field of Classification Search .................... 705/17, 705/26.1; 235/375
See application file for complete search history.

(56) References Cited

U.S. PATENT DOCUMENTS

| | | | |
|---|---|---|---|
| 7,248,855 B2 * | 7/2007 | Joyce et al. | 455/406 |
| 7,616,746 B2 * | 11/2009 | O'Neill | 379/114.01 |
| 2003/0157925 A1 * | 8/2003 | Sorber et al. | 455/406 |
| 2004/0141601 A1 * | 7/2004 | Cai et al. | 379/114.2 |
| 2005/0080733 A1 | 4/2005 | McIntosh | 705/40 |
| 2006/0034438 A1 * | 2/2006 | O'Neill | 379/114.07 |
| 2006/0167764 A1 | 7/2006 | Stellittano | 705/26 |
| 2006/0173784 A1 | 8/2006 | Marples et al. | 705/52 |
| 2008/0133379 A1 * | 6/2008 | Rowe | 705/26 |

OTHER PUBLICATIONS

Buzalka, Mike, Compass Tests Cashless System, Jul. 1, 2001, Food Management—http://food-management.com/business-amp-industry/compass-tests-cashless-system.*

* cited by examiner

*Primary Examiner* — Bradley B Bayat
(74) *Attorney, Agent, or Firm* — Kilpatrick Townsend & Stockton LLP

(57) ABSTRACT

A payment method and system are provided for electronic data that is purchased by a recipient from a supplier thereof for transmission to the recipient with payment being made in advance of downloading of the electronic data. The pre-payment entitles the recipient to a predetermined period of time online, or a predetermined quantity of downloaded electronic data. Payment control means associated with communication means communicates with a source of funding associated with the particular recipient and an allocated funds register is associated with the source of funding such that an initial quantum of value contained in the source of funding is credited to the allocated funds register. The payment control means monitors the balance remaining in the allocated funds register and when a predetermined low value is reached a further predetermined quantum of value contained in the source of funding is credited to the allocated funds register to increase the balance therein and enable continued connectivity.

14 Claims, 2 Drawing Sheets

PAYMENT SYSTEM FOR ELECTRONIC DATA

CROSS REFERENCE TO RELATED APPLICATIONS

The present application is a National Phase Application of International Application No. PCT/IB2007/003847 filed Dec. 10, 2007, which claims priority to South African Patent Application No. 2006/10620, filed Dec. 18, 2006, which applications are incorporated herein fully by this reference.

FIELD OF THE INVENTION

This invention relates to a payment system for electronic data of a wide range of different types including data that is formatted for reproduction in the form of audio, visual, or audiovisual media; including, but not limited to, music, dialogue, movies of all different types, television broadcasts, graphics and literary information of all different types, communications generally, as well as Internet access (including voice applications over the Internet) and e-mail.

More particularly, the invention relates to a payment system for electronic data wherein the data is purchased on the basis of a rate that is charged either for a predetermined period of time, or a predetermined quantity of data, with payment generally being made in advance of the data transfer, usually by downloading of the electronic data purchased in a process that is often referred to as streaming.

It is to be understood that the term "electronic data" as used in this specification is intended to be interpreted broadly and, in particular, includes any content irrespective of its exact technological nature that is transmitted wirelessly, by land line, cable, or any other medium from a supplier to an electronic device of a recipient or purchaser.

Also, the term "payment", is intended to mean the transfer of any type of credit value whether or not it be directly related to money terms.

BACKGROUND TO THE INVENTION

Modern-day technology is making more and more electronic data available to recipients by transmission from a remote supplier particularly in consequence of the ever increasing bandwidth available for the transmission thereof. In order to make business sense, much of this electronic data is made available only against prepayment by some suitable or appropriate means.

Whilst there is little difficulty in instances in which a recipient purchases a predetermined "package", that could be a complete computer program, movie, song or musical score, there are numerous instances in which the extent of the electronic data that the recipient wishes to purchase, or the duration of online time required, is unknown, and may remain unknown until a significant quantity of electronic data has already been received, or online time consumed.

Prepayment is generally required for a predetermined period of time, say 30 minutes or one hour, or whatever other period of time is appropriate to the relevant electronic data, or, alternatively, prepayment may be made for a predetermined quantity of data, say a predetermined number of megabytes.

This arrangement leads to appreciable difficulties in that the prepaid time period may expire, or the prepaid quantity of data may have been received, before the required objective has been achieved. It is generally not possible to make another payment without going offline; making an additional payment; and going back online, often with the formidable task of trying to pick up where the activity left off, which is sometimes, in any event, impossible.

On the other hand, if a substantial prepayment was made on a "more than enough" basis and the recipient discovers that the data being received is not what is required, the balance of the payment made may be lost, or at least remain as an unwanted credit.

The upshot of this problem is that recipients often end up paying more than is necessary; and the supplier of the electronic data often ends up selling less because of terminated download sessions.

OBJECT OF THE INVENTION

It is an object of this invention to provide a payment system and components thereof whereby the difficulties indicated above can be alleviated, at least to some extent.

SUMMARY OF THE INVENTION

In accordance with this invention there is provided a payment system for electronic data that is purchased by a recipient from a supplier thereof for transmission to the recipient and wherein payment is made in advance of downloading of the electronic data on the basis of a particular payment entitling the recipient to a predetermined period of time online, or a predetermined quantity of downloaded electronic data, and wherein payment control means are included for terminating a downloading session when said predetermined period of time online has expired or said quantity of electronic data has been received, the payment system being characterised in that the payment control means is associated with communication means enabled to communicate with a source of funding associated with the particular recipient in which electronic value is stored to the credit of, or that is available to, the particular recipient and wherein an allocated funds register is associated with the source of funding, the arrangement being such that an initial quantum of value contained in the source of funding may be credited to the allocated funds register and wherein the payment control means monitors the balance remaining in the allocated funds register and, when a predetermined low value is reached, causes a further predetermined quantum of value contained in the source of funding to be credited to the allocated funds register to increase the balance therein, and wherein the crediting of quantums of value to the allocated funds register is repeatable as may be permitted by prescribed constraints.

Further features of this aspect of the invention provides for the payment control means, at the end of a particular session, to cause a transfer of funds to be effected from the accumulated value of the allocated funds register to a financial account of the supplier; for the value transferred to be determined on the basis of the actual extent of online time or downloaded data used or received by the recipient with any residue remaining as a credit in the allocated funds register preferably being reassigned to the source of funding; and for one of the prescribed constraints to be an overall maximum accumulated credit value of the allocated funds register that may be selected by the recipient.

The invention also provides a method of transferring funds from a source of funding of a recipient to a financial account of a supplier in payment for online time or downloaded data in a system in which electronic data is purchased by a recipient from a supplier thereof for transmission to the recipient and wherein payment is controlled by way of payment control means that operatively monitors a credit value balance established in advance of transfer of electronic data and that is decremented according to online time expired or quantity of data downloaded with the payment control means being adapted to cause termination of a downloading session when said predetermined period of time online has expired or said quantity of electronic data has been received, the method being characterised in that an allocated funds register is associated with the source of funding of a particular recipient with the method including the steps of;

(i) causing an initial quantum of value contained in the source of funding to be credited to the allocated funds register;
(ii) monitoring the balance remaining in the allocated funds register by way of the payment control means;
(iii) causing a further predetermined quantum of value contained in the source of funding to be credited to the allocated funds register to increase the balance therein when a predetermined low value is reached in the allocated funds register;
(iv) if permitted by prescribed constraints, and as may become necessary according to remaining credit in the allocated funds register, crediting one or more further quantums of value to the allocated funds register; and,
(v) causing a transfer of funds due to the supplier from the allocated funds register to a financial account of the supplier.

Further features of the method of the invention provide for the value of the transfer of funds from the allocated funds register to the financial account of the supplier to be determined on the basis of the actual extent of online time or downloaded data used or received by the recipient in which instance any residue remaining as a credit in the allocated funds register is preferably reassigned to the source of funding.

It will therefore be understood that in a system according to the invention, reservation or allocation of funds for electronic data, or online time, is made automatically on an incremental or progressive basis in which predetermined quantities of value are credited to an allocated funds register from a source of funding and the accumulated credit in the allocated funds register is used to effect the actual payment, typically at the end of a particular session.

As a result, downloading or streaming of data may be made in an ongoing manner and without interruption so long as the source of funding continues to have credit value available that can be credited to the allocated funds register and that predetermined constraints are imposed such as, for example, remaining credit value or maximum value available for transfer to the allocated funds register. Also, it is possible for the recipient to terminate a downloading or online session at any time should the data prove to be unsatisfactory or unwanted.

It will be understood that the term "allocated funds register" as used in this specification is intended to be interpreted broadly as simply being a facility whereby funds in a source of funding that have been "allocated" are rendered unavailable for any other purpose until such time as payment has been made to the supplier and, as the case may be, any residual balance as been reassigned and rendered free for use for other purposes. The process of "allocation" could thus be a simple tagging of funds that to all intents and purposes remain in the source of funding until transferred, directly or indirectly, to an account of a supplier with any residual balance optionally being untagged and reassigned for general use. Alternatively, the process of "allocation" could involve an actual transfer of funds from the source of funding to some form of holding account that could be physically located at any suitable place, typically a financial institution concerned, provided that it remained accessible to the payment control means to perform the necessary transactions. In all cases the funds "allocated" are regarded as being credited to a hypothetical or real "allocated funds register".

In order that the invention may be more fully understood an expanded description of an implementation thereof now follows with reference to the accompanying drawings.

DETAILED DESCRIPTION WITH REFERENCE TO THE DRAWING

Figure 1:
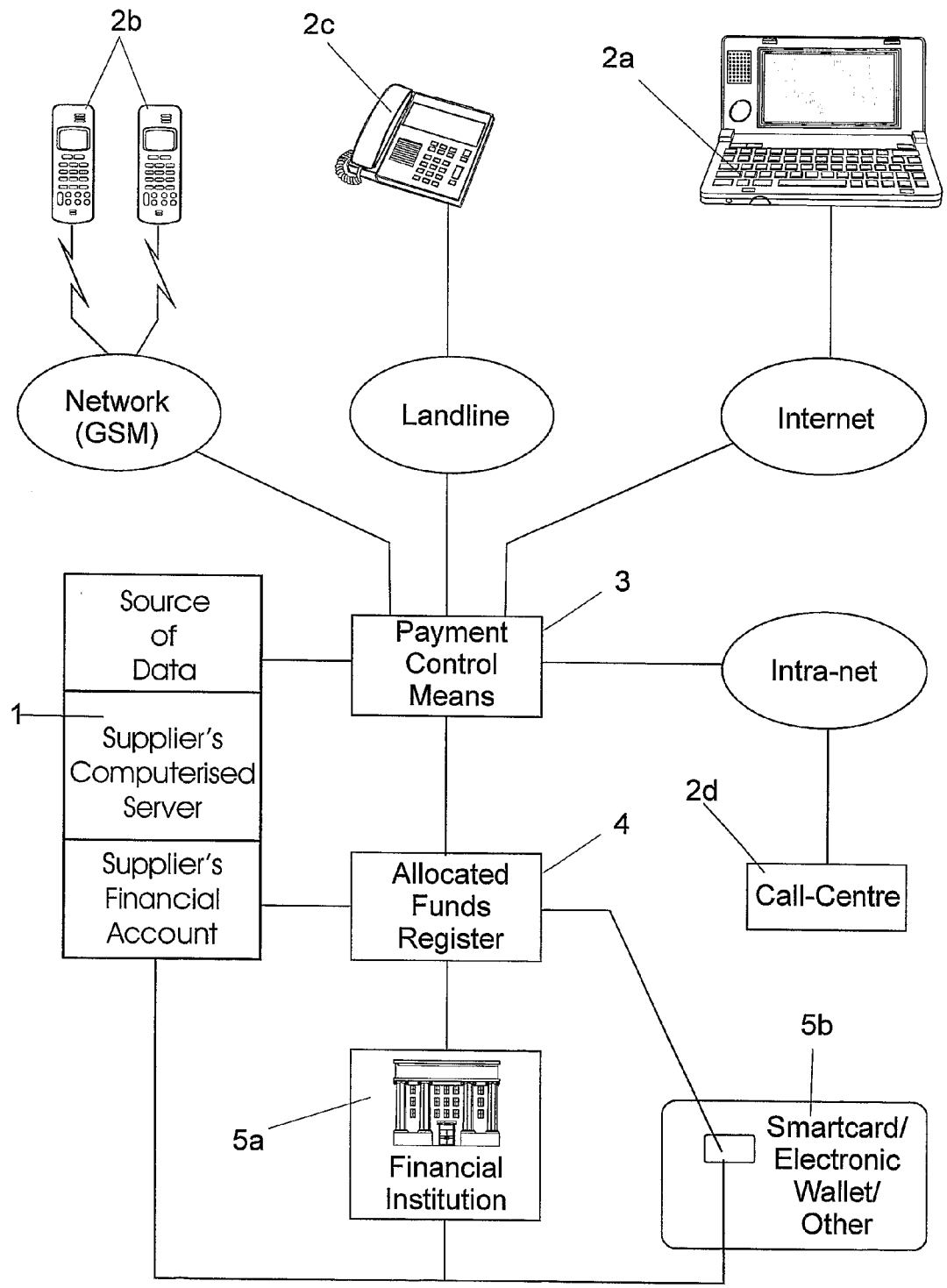
FIG. 1 illustrates schematically one implementation of the invention in an existing network system in which data can be downloaded to a variety of different electronic devices and payment can be made using a variety of different sources of funding; and, FIG. 2 is a schematic block diagram illustrating the transfer of funds in exchange for downloaded data or online time in a system according to the invention.
Figure 2:
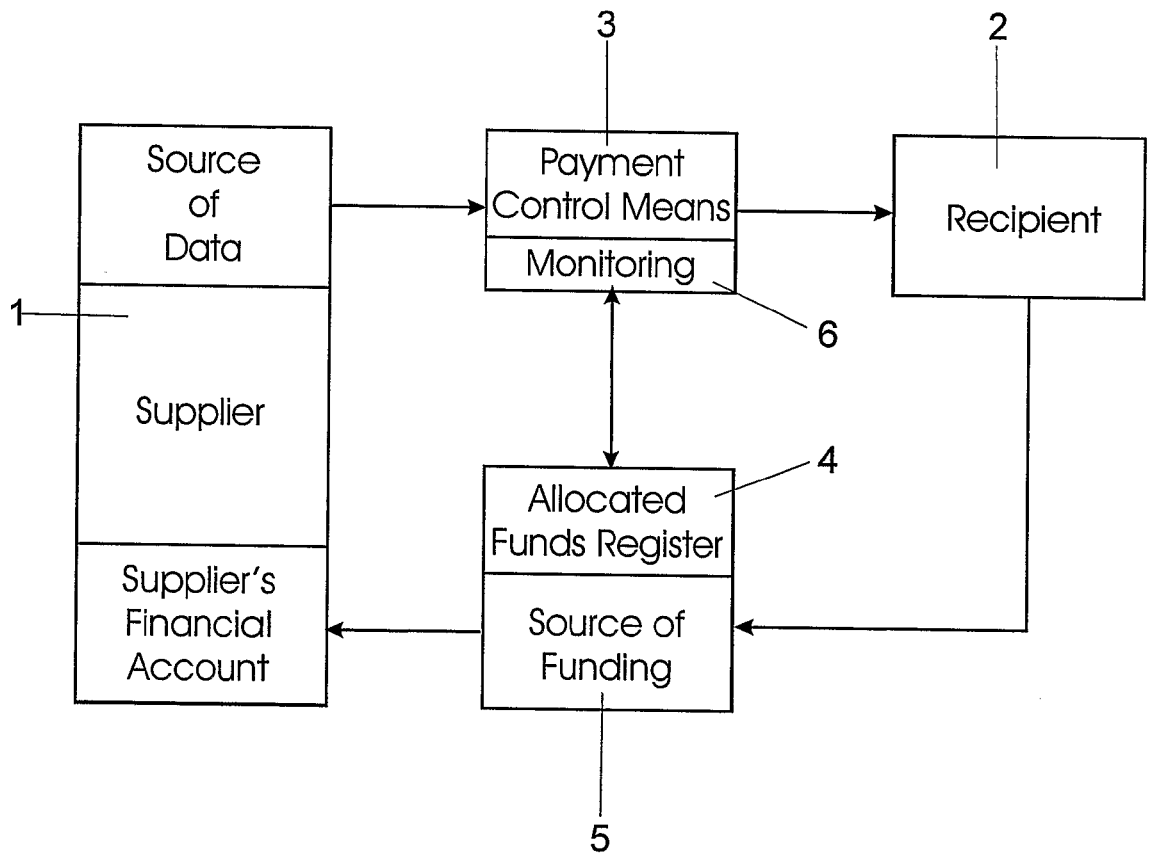

As illustrated in the drawings, the system of the invention is aimed at controlling the streaming of data, or online time, between a data or service provider, herein referred to as the supplier (1), and a recipient purchaser (2) of data or online time. The purchaser may communicate with the supplier by any suitable communications means such as a computer (2a); a cellular telephone (2b); a land line telephone (2c); a call centre (2d); or any other appropriate communications device or facility.

Interposed between the supplier and the recipient, at least for the purposes of downloading data in respect of which payment is required, is a payment control means (3) of any suitable type and that enables or disables transfer of data or connectivity according to whether or not credit value is available in an allocated funds register (4).

The allocated funds are credited to the allocated funds register from a source of funding (5) that could be an online source, such as a bank or other financial institution (5a), or an offline source such as a smartcard, electronic wallet, or any other such item (5b) having a memory serving to retain credit value and that is arranged to be decremented as may be required by an authorized person. Of course, the source of funding could also be an ordinary credit card. The payment control means includes monitoring means (6) configured to monitor the balance remaining in the allocated funds register This general type of system is quite common and its operation will be quite apparent to those skilled in the art. The recipient is thus able to interact with the payment control means in order to access the source of data of the supplier against payment.

In terms of this invention, the payment control means includes monitoring means (6) that is configured to not only monitor the balance remaining in the allocated funds register but to automatically effect a crediting of a predetermined quantum of funds value to the allocated funds register from the source of funding when the balance remaining in the allocated funds register reaches a certain predetermined low value that could be a percentage of the original quantum of credit in the allocated funds register.

The balance of credit value in the allocated funds register is thus increased automatically during the downloading or online activity by a quantum that is predetermined so that there is no interruption in the connectivity and thus in the activity in which the recipient is engaged. The process can be repeated as many times as is necessary to complete the required activity or for so long as available credit value remains in the source of funding, or until some other limitation is reached that would generally take the form recipient selected prescribed constraints, typically, a maximum selected by the recipient.

Of course, in the event that the recipient desires to terminate the downloading process or online connection, for whatever reason, only a relatively small balance remaining in the allocated funds register will either be forfeited or remain as a credit for possible future use, or, more preferably, could simply be released back into the source of funding. The balance of the recipient's available credit in the source of funding would, at all times, remain unaffected by the activity and would be available for other purposes.

Accordingly, the system and method of the invention enables a recipient to select a payment mechanism, set some parameters, for example the maximum that the recipient is able or willing to pay, and to start a streaming process or initiate connection with a supplier/service provider. The recipient then has the option to abort the activity as may be desired. This may be when all of the required activity has been concluded, or for instance, when the recipient realises that wrong or unwanted content is being downloaded.

As regards the financial arrangements between the recipient and supplier, they may both have access to a financial transaction system that supports debits and credits between financial accounts of the two. This means that some mechanism of clearing and settlement exists between the two financial accounts and this may operate in ways that are similar to those currently used with many different existing payment mechanisms. Thus, the source of funding could be a credit card environment in which the recipient is a cardholder, and the supplier is a merchant, or it could be an implementation of an electronic wallet—where both parties own electronic wallets that support payments between the two.

The source of funding is preferably able to support the notion of "allocation" of funds being a mechanism whereby an amount is reserved in the purchaser's source of funding and is earmarked or tagged for possible payment to the supplier, but not yet paid. Reserved or allocated funds can be either debited and transferred to the supplier as indicated above, or it can be released into the source of funding to make it available for other purposes. Of course, it is also possible to actually transfer the allocated funds out of the existing account, at least temporarily, and return any surplus once the downloading activity has ceased.

More particularly, in use, the streaming of content is triggered by the recipient through an interaction with the payment control means and the recipient is preferably informed of the following parameters, and accepts, or adjusts insofar as may be permitted, the values that are presented prior to the streaming starting. The various values may be represented as follows:

V=the extent of the streaming variable that has been used in any one session and it could be measured in time, megabytes etc.

R=the billing rate

A(p)=the amount payable for the amount of V that has been used

A(max)=The maximum amount that the purchaser is prepared to pay for the session and that is preset by the recipient.

A(inc)=The incremental amount to be allocated each time the payment control means triggers a quantum to be created from the source of funding to the allocated funds register.

A(del)=the remaining credit value in the allocated funds register that is selected to trigger the crediting of another quantum of credit to the allocated funds register.

Purchase of streaming content could then happen in the following way:

1. The recipient would initiate the process. The payment control means would credit to the recipient's allocated funds register a quantum (A(inc)) of credit from the source of funding. The streaming would then start.
2. As the streaming of content continues, the value of the streaming that has been received would be calculated continuously as V×R. If the difference between this amount and A(inc) is smaller than A(del), the payment control means would attempt to allocate a further quantum (A(inc)) of credit to the allocated funds register from the source of funding.
3. If the total amount reaches A(max) at any time, the streaming would be stopped by the payment control means. Similarly, if the payment control means is unable to reserve any further funds, the streaming would be stopped when the allocated amount is exhausted.
4. The purchaser can, of course, discontinue streaming at any stage.
5. When streaming stops either as a result of action by the recipient, or by the payment controller, the amount payable A(p)(=V×R) is calculated, and transferred from the allocated funds register to a financial account of the supplier and, at the same time, the recipient is credited with any residue.

An Example

Streaming parameters of a time based situation:
V is time in minutes
R as the billing rate of 2 $ per minute
A(max) is the maximum set by the recipient as $50
A (inc) is the incremental amount allocated to quantum as $15
A (del) is credit value remaining when a quantum is added: $3

The streaming process is started by way of the payment controller that initially reserves $15 from the recipient's source of funds. As the content is streaming the value is decremented by the product of time in minutes and the billing rate of $2 per minute.

After six minutes of streaming, the value is 2×6=$12. The difference between the allocated amount of $15, and the current value ($12) is now equal to A(del) ($3). As the steaming continues, the payment control means attempts to and successfully extends the allocation by a quantum of another $15 to $30. This process can be repeated once more to a total of $45 and will thereafter fail in view of the A(max) of $50 set by the purchaser that would be exceeded if another $15 were allocated.

Alternatively, the purchaser may discontinue the streaming after, say, ten minutes. In this instance the final amount is calculated as $20 (10×$2) that is being paid by transferring it to the financial account of the supplier; the balance ($10) of the allocation is released; and the source of funding of the purchaser is debited with $20.

It is anticipated that the application of this invention will increase in relevance with growth in bandwidth and devices that will enable consumers to connect to broader bandwidths. Opportunities to apply this invention are presently already numerous. Some of these are as follows:

WiFi Hotspots are available in multiple locations (for instance Airports, Coffee shops etc.) Access to these Hotspots enables any-one with a WiFi enabled computer to gain access to the Internet. Many different mechanisms exist for payment to gain access to these Hotspots, of which payment by credit card for a fixed price and a fixed time period is the most popular (for instance $10 for 30 minutes). The problem with this mechanism is that recipients may have bought too little time leading to the service being discontinued at a critical time (for instance in the middle of an e-mail download session). Alternatively, a recipient may have bought too much time, leading to wastage. The different time periods that can be purchased is often not acceptable (for instance a recipient would possibly want to buy 3 hours of connectivity, but is only offered ½ hour, 1 hour and 6 hour options).

Utilising Intenet Protocol (IP) for voice communication has grown spectacularly during the past few years. It is especially a company like Skype that have popularised this way of making a telephone call. Today the use of IP telephony is a widespread phenomena. One of the biggest challenges in making this type of communication commercially successfully available has always been the lack of a suitable payment mechanism. The current mechanism is to either utilise a post pay approach or to get the purchaser to pay some credit up front and to deposit this credit into a "wallet" or purse. The problem with the wallet or purse approach is that the service may get discontinued in the middle of a conversation if insufficient credit is not available in the purse. Also a consumer will often have credit in a purse that is not being utilised, having paid more than is required. Information as to how much is being spent and at what rate is also not available. All of these issues may be addressed by a payment mechanism according to the invention.

Streaming video on cellphones is gaining momentum and many analysts are of the opinion that this technology will become available to most recipients as the year 2010 approaches. One of the biggest constraining factors is the need for a workable payment mechanism to achieve this. An approach that is often used is to request an upfront, once-off payment for the whole "video-clip". The problem with this approach is that the buy decision is therefore a binary decision (yes, no), not "I would like to pay some and see some and then maybe buy more". The latter approach would, it appears to applicant, entice a much bigger marketshare. It is also difficult to implement variable clip-sizes with the upfront payment mechanism, or the notion of subscription to episodes etc. With the payment system and method of the invention many of these problems will be overcome.

It is considered that this system can be implemented to substantial advantage by making use of the unique characteristics of a mobile payment solution based on a push clearing paradigm. This is because the immediate payment feedback and input fields required to perform this payment can more easily be implemented on a mobile phone. In addition, the complexity (and multitude) of payment instructions on the source of funding (reserve, commit, roll-back etc.) is easier to implement in a message-based, push clearing paradigm of the type employed in mobile payment solutions.

Obviously numerous applications and configurations of the invention are possible without departing from the scope hereof, the aforegoing simply being illustrative of the nature of the invention.

The invention claimed is:

1. A payment system whereby electronic data is purchased by a recipient from a supplier thereof, wherein the electronic data purchased is transmitted to the recipient and wherein payment is made in advance of downloading of the electronic data on the basis of a particular payment entitling the recipient to any one of a predetermined period of time online and a predetermined quantity of downloaded electronic data, wherein the system comprises:

a processor, configured to function as a payment controller that terminates a downloading session when said predetermined period of time online has expired or said quantity of electronic data has been received, wherein the payment controller is associated with communication means selected from a computer, a cellular telephone, a land line telephone and a call centre and that is enabled to communicate with a source of funding selected from an online source in the form of a financial institution, and an offline source selected from a smartcard and an electronic wallet, in each instance having a memory serving to retain credit value that is arranged to be decremented as may be required, wherein the source of funding is associated with the particular recipient and stores electronic value to the credit of the particular recipient, and an allocated funds register associated with the source of funding, wherein an initial quantum of value contained in the source of funding is credited to the allocated funds register, and the payment controller monitors a balance remaining in the allocated funds register during the downloading of electronic data and online connectivity and, in response to a predetermined low value balance being reached in the allocated funds register, automatically causes a further predetermined quantum of available value contained in the source of funding to be credited to the allocated funds register to increase the balance therein to thereby prevent it from reaching zero and causing an interruption in downloading to allow downloading to continue and online connectivity to continue uninterrupted, and wherein the crediting of quantums of value to the allocated funds register is repeatable as may be permitted by prescribed constraints, in which one of the prescribed constraints is an overall maximum accumulated credit value of the allocated funds register that is selected by the recipient.

2. A payment system as claimed in claim 1 in which the payment controller, at the end of a particular session, causes a transfer of funds to be effected from the accumulated value of the allocated funds register to a financial account of the supplier.

3. A payment system as claimed in claim 2 in which the accumulated value transferred is determined on the basis of the actual extent of online time or downloaded data used or received by the recipient with any residual value remaining as a credit in the allocated funds register.

4. A payment system as claimed in claim 2 in which the accumulated value transferred is determined on the basis of the actual extent of online time or downloaded data used or received by the recipient with any residual value being reassigned to the source of funding.

5. A method of transferring funds from a source of funding of a recipient selected from an online source in a form of a financial institution, and an offline source selected from a smartcard and an electronic wallet, in each instance having a memory serving to retain credit value that is arranged to be decremented as may be required, to a financial account of a supplier in payment for online time or downloaded data in a system in which electronic data is purchased by a recipient from a supplier thereof for transmission to the recipient and wherein payment is controlled by way of a processor, configured to function as a payment controller that operatively monitors a credit value balance established in advance of transfer of electronic data and that is decremented according to online time expired or quantity of data downloaded with the payment controller being adapted to cause termination of a downloading session when said predetermined period of time online has expired or said quantity of electronic data has been received, wherein an allocated funds register is associated with the source of funding of a particular recipient with the method including the steps of:

receiving prescribed constraints comprising an overall maximum credit value of the allocated funds register from the recipient;

causing an initial quantum of value contained in the source of funding to be credited to the allocated funds register;

monitoring the balance remaining in the allocated funds register by way of the payment controller;

automatically causing a further predetermined quantum of value contained in the source of funding to be credited to the allocated funds register to increase the balance therein when a predetermined low value balance is reached in the allocated funds register to thereby prevent it from reaching zero and causing an interruption in downloading to allow downloading to continue and online connectivity to continue uninterrupted;

if permitted by the prescribed constraints, and as may become necessary according to remaining credit in the allocated funds register, crediting one or more further quantums of value to the allocated funds register; and, causing a transfer of funds due to the supplier from the allocated funds register to a financial account of the supplier.

6. A method as claimed in claim 5 in which the value of the transfer of funds from the allocated funds register to the financial account of the supplier is determined on the basis of the actual extent of online time or downloaded data used or received by the recipient and any residual value is retained as a credit in the allocated funds register.

7. A method as claimed in claim 5 in which the value of the transfer of funds from the allocated funds register to the financial account of the supplier is determined on the basis of the actual extent of online time or downloaded data used or received by the recipient and any residual value remaining as a credit in the allocated funds register is reassigned to the source of funding.

8. The method of claim 5 wherein the electronic data downloaded during downloading comprises streaming video.

9. The method of claim 8 wherein the electronic data is downloaded to the cellular phone.

10. The method of claim 9 wherein the source of funding is the electronic wallet.

11. The method of claim 5 further comprising transferring any residual value in the allocated funds register to the source of funding.

12. The method of claim 11 wherein the source of funding is a smart card.

13. The method of claim 11 wherein any residual funds in the allocated funds register are forfeited.

14. The method of claim 11 wherein any residual funds in the allocated funds register are credited for future use.

* * * * *